United States Patent
Persson et al.

(10) Patent No.: US 11,147,037 B2
(45) Date of Patent: Oct. 12, 2021

(54) DEDICATED RNTI(S) FOR RESPONSE-DRIVEN PAGING

(71) Applicant: Telefonaktiebolaget LM Ericsson (publ), Stockholm (SE)

(72) Inventors: Claes-Göran Persson, Mjölby (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/760,067

(22) PCT Filed: Nov. 16, 2018

(86) PCT No.: PCT/IB2018/059047
§ 371 (c)(1),
(2) Date: Apr. 29, 2020

(87) PCT Pub. No.: WO2019/097473
PCT Pub. Date: May 23, 2019

(65) Prior Publication Data
US 2020/0351816 A1 Nov. 5, 2020

Related U.S. Application Data

(60) Provisional application No. 62/587,340, filed on Nov. 16, 2017.

(51) Int. Cl.
*H04W 68/00* (2009.01)
*H04W 4/00* (2018.01)
*H04W 74/08* (2009.01)

(52) U.S. Cl.
CPC ....... *H04W 68/00* (2013.01); *H04W 74/0833* (2013.01)

(58) Field of Classification Search
CPC ................... H04W 68/00; H04W 74/0833
(Continued)

(56) References Cited

U.S. PATENT DOCUMENTS 9,699,624 B1 * 7/2017 Huang ................. H04W 68/02
2001/0026547 A1 * 10/2001 Moulsley ............ H04W 74/002
370/347
(Continued)

FOREIGN PATENT DOCUMENTS

WO WO-2013107387 A1 * 7/2013 .......... H04W 68/025

OTHER PUBLICATIONS

Machine Translation of WO-2013107387.*
(Continued)

*Primary Examiner* — Mark G. Pannell
(74) *Attorney, Agent, or Firm* — Baker Botts, LLP

(57) ABSTRACT

According to some embodiments, a method performed by a wireless device for receiving paging information comprises receiving a paging message from a network node. The paging message includes a paging indicator associated with a plurality of wireless devices (e.g., group paging message). The method further comprises determining the wireless device is associated with the paging indicator, transmitting a random access request message to the network node, and receiving a random access response message from the network node. The random access response message is associated with a radio network temporary identifier (RNTI). The method further comprises determining, based on the RNTI, that the random access response includes additional paging information for the wireless device, and decoding the random access response.

17 Claims, 10 Drawing Sheets

(58) Field of Classification Search
USPC .......................................................... 455/458
See application file for complete search history.

(56) References Cited

U.S. PATENT DOCUMENTS

| | | | | |
|---|---|---|---|---|
| 2003/0058972 | A1* | 3/2003 | Iochi | H04L 7/042 375/343 |
| 2009/0088175 | A1* | 4/2009 | Pelletier | H04W 72/044 455/450 |
| 2009/0232095 | A1* | 9/2009 | Ahn | H04W 74/006 370/331 |
| 2010/0232363 | A1* | 9/2010 | Hsu | H04L 1/0091 370/328 |
| 2010/0232364 | A1* | 9/2010 | Hsu | H04W 74/085 370/328 |
| 2011/0170503 | A1* | 7/2011 | Chun | H04W 74/006 370/329 |
| 2013/0015953 | A1* | 1/2013 | Hsu | H04W 4/08 340/7.46 |
| 2013/0229965 | A1* | 9/2013 | Bressanelli | H04W 68/005 370/311 |
| 2014/0126520 | A1* | 5/2014 | Quan | H04W 74/0866 370/329 |
| 2014/0219204 | A1* | 8/2014 | Park | H04L 1/1822 370/329 |
| 2017/0273078 | A1* | 9/2017 | Alvarino | H04W 68/00 |
| 2017/0280481 | A1* | 9/2017 | Stern-Berkowitz | H04W 74/008 |
| 2018/0184461 | A1* | 6/2018 | Zhang | H04W 72/042 |
| 2020/0059891 | A1* | 2/2020 | Huang | H04W 72/04 |

OTHER PUBLICATIONS

3GPP TSG-RAN WG1 Meeting #89; Hangzhou, China; Source: Ericsson; Title: On NR paging design (R1-1708724)—May 15-19, 2017.

3GPP TSG RAN WG1 Meeting NR#3; Nagoya, Japan; Source: LG Electronics; Title: RACH procedure (R1-1715846)—Sep. 18-21, 2017.

3GPP TSG-RAN WG2 Meeting #96; Reno, USA; Source: Nokia, Alcatel-Lucent Shanghai Bell; Title: Paging in NR at HF operation (R2-168124)—Nov. 14-18, 2016.

3GPP TSG-RAN WG2 #98; Hangzou, P.R. of China; Source: Ericsson; Title: Response-driven paging to reduce beam sweeping overhead in NR (Tdoc R2-1704763)—May 15-19, 2017.

3GPP TSG-RAN WG2 #101; Athens, Greece; Source: Ericsson; Title: Dedicated RNTI(s) for response-driven paging (Tdoc R2-1802336)—Feb. 26-Mar. 2, 2018.

PCT International Search Report for International application No. PCT/IB2018/059047—dated Mar. 8, 2019.

PCT Written Opinion of the International Searching Authority for International application No. PCT/IB2018/059047—dated Mar. 8, 2019.

3GPP TS 38.331 v0.1.0; Technical Specification; 3rd Generation Partnership Project; Technical Specification Group Radio Access Network; NR; Radio Resource Control (RRC); Protocol Specification (Release 15)—Oct. 2017.

3GPP TSG-RAN WG2 Meeting #97bis; Spokane, USA; Source: Nokia, Alcatel-Lucent Shanghai Bell; Title: Configurable Paging Procedure for NR (R2-1702779)—Apr. 3-7, 2017.

3GPP TSG-RAN WG2#99; Berlin, Germany; Source: Ericsson; Title: Response-driven paging to reduce beam sweeping overhead in NR (R2-1708537)—Aug. 21-25, 2017.

* cited by examiner

DEDICATED RNTI(S) FOR RESPONSE-DRIVEN PAGING

PRIORITY

This nonprovisional application is a U.S. National Stage Filing under 35 U.S.C. § 371 of International Patent Application Serial No. PCT/IB2018/059047 filed Nov. 16, 2018 and entitled "Dedicated RNTI(S) For Response Driven Paging" which claims priority to U.S. Provisional Patent Application No. 62/587,340 filed Nov. 16, 2017 both of which are hereby incorporated by reference in their entirety.

TECHNICAL FIELD

Embodiments of the present disclosure are directed to wireless communications and, more particularly, to using dedicated radio network temporary identifiers for response-driven paging in fifth generation (5G) new radio (NR).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third generation Partnership Project (3GPP) fifth generation (5G) systems (e.g., new radio (NR)), may use high carrier frequencies, for example, in the range 6-100 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario if omnidirectional receive and transmit antennas are used.

Beamforming may compensate for the loss of link budget in high frequency spectrum. This is particularly important when communicating with user equipment (UEs) with poor receivers (e.g., low cost/low complexity UEs). Other means for improving the link budget include repetition of the transmissions (e.g., to facilitate wide beam or omnidirectional transmission) or use of single frequency network (SFN) transmission from multiple transmission/reception points (TRPs) in the same or different cells.

Because of the properties described above, in the high frequency bands, many downlink signals, such as synchronization signals, system information, and paging, which need to cover a certain area (i.e., not just targeting a single UE with known location/direction, but instead targeting an entire cell, for example), may be transmitted using beam sweeping (i.e., transmitting the signal in one beam at a time) sequentially changing the direction and coverage area of the beam until the transmission covers the entire intended coverage area (e.g., the cell).

Paging is an essential function in a mobile telecommunications system. The network uses paging to contact a UE, primarily to transmit downlink data to the UE, after the UE has responded to the page. Paging can also be used to inform UEs of updates of the system information in a cell. Paging may also be used for informing UEs of an ongoing public warning, such as an earthquake and tsunami warning system (ETWS).

In LTE, a UE in RRC_IDLE state camps on a cell, and while camping monitors the paging channel associated with that cell. The UE is configured to monitor repeatedly occurring paging occasions (POs) and may reside in a discontinuous reception (DRX) sleep mode in between the paging occasions. When the UE is paged at a paging occasion, the paging is indicated on the physical downlink control channel (PDCCH) in the form of a downlink scheduling allocation addressed to the paging radio network temporary identifier (P-RNTI) (which is shared by all UEs).

The downlink scheduling allocation indicates the downlink transmission resources on the physical downlink shared channel (PDSCH) where the actual paging message is transmitted. A UE in RRC_IDLE state, which receives a downlink scheduling allocation addressed to the P-RNTI at one of the UE's paging occasions, receives and reads the paging message from the allocated downlink transmission resources to find out whether the paging message is intended for the UE.

The UE(s) that is(are) subject to the paging is(are) indicated in the paging message through one or more UE paging identifiers (e.g., system architecture evolution (SAE) temporary mobile subscriber identity (S-TMSI) or international mobile subscriber identity (IMSI)), wherein each UE paging identifier is included in a paging record. In LTE up to 16 UEs may be addressed (i.e., one paging message may include up to 16 paging records).

As described above, paging in NR may be transmitted using beamforming transmission on high carrier frequencies (e.g., above 6 GHz) and thus beam sweeping (with up to 64 beams in the currently specified highest frequency bands) is used to cover an entire cell with the page. This creates a large amount of control signalling overhead, particularly because the paging signals are typically transmitted in multiple cells.

To reduce the control signalling overhead associated with paging on higher carrier frequencies, a group paging concept has been proposed in 3GPP where the paging identifier is associated with multiple UEs or a group of UEs. The size of the initial downlink message over the radio interface in the paging procedure is reduced by use of a shorter paging identifier (also known as a group paging identifier) compared to using a full UE paging identifier (e.g., 5G-S-TMSI, S-TMSI or IMSI). A UE receiving a paging message containing its group paging identifier needs to contact the network to find out whether it is actually being paged or not. This concept is also known as response-driven paging.

In NR, paging can be used for a UE in either RRC_IDLE state or RRC_INACTIVE state. The RRC_INACTIVE state is a new state introduced in NR and which is now also supported in EUTRAN (i.e., LTE) if the UE is connected to the 5G core network (5GC). In the RRC_INACTIVE state, the core network (CN) regards the UE as connected, thus the CN-RAN connection is kept active although the RRC connection between the gNB and the UE is released.

When the core network has user data or control data to send to the UE, the data is sent to the anchor gNB which initiates paging of the UE (also referred to as a RAN initiated page). In RRC_INACTIVE, the UE sends a periodic RAN Area Update to the network. The UE can, however, move around in a RAN Notification Area (RNA) configured by the network without informing the network of its location within the RNA. When the UE leaves its configured RNA, the UE informs the network. For a UE in the RRC_IDLE state, paging is initiated by the core network. For a UE in the RRC_INACTIVE state, paging is initiated by the RAN (e.g., an anchor gNB that stores the UE's RAN context).

SUMMARY

Based on the description above, certain challenges currently exist. For example, response-driven paging uses shorter paging identifiers (referred to as a paging indicator (PI)), whereby multiple user equipment (UEs) can be addressed with one and the same PI. When a UE receives the initial downlink message containing the paging indication and a matching PI, the UE does not know whether it is actually being paged or if another UE with the same allocated PI is the actual target of the page. To resolve this ambiguity, the UE needs to contact the network, which transmits the additional paging information (i.e., the full UE paging identifier(s)) to the UE in a downlink beam.

Response-driven paging reduces the amount of data initially transmitted by the network in the paging beam sweep, but it does so at the expense of increased signalling in the uplink and at the expense of lost UE uniqueness in the initial paging indication. As a result, a large fraction of the UEs contacting the network (after finding a matching PI in the paging indication) to find out if they were indeed target by the paging indication will do so in vain.

In addition, because the UEs use physical random access channel (PRACH) resources to contact the network, the UEs will transmit random access preambles mixed with other UEs in the cell transmitting random access preambles for the purpose of regular random access (i.e., not responding to paging indications containing PIs). The combined preamble transmissions from UEs responding to paging indications containing PIs and UEs initiating regular random access (i.e., not responding to a paging indication with a matching PI) generate an increased number of response messages from the network, which all the preamble transmitting UEs have to monitor. The resulting increased response message decoding effort represents an undesirable burden for the UEs.

Certain aspects of the present disclosure and their embodiments may provide solutions to these or other challenges. Particular embodiments use one or more dedicated radio network temporary identifiers (RNTIs) scrambled into the cyclic redundancy check (CRC) in the downlink control information (DCI) on the PDCCH when the network transmits response messages to preambles which are dedicated for request of additional paging information in conjunction with response-driven paging. The dedicated RNTI indicates to a UE receiving the scheduling allocation for the response message whether the response message is of the type the UE is interested in. Thus, the UE can refrain from decoding the actual response message if the RNTI indicates a non-interesting response type.

For example, a UE having transmitted a regular random access preamble for the purpose of regular random access can refrain from decoding the response message if the associated RNTI indicates that the response message is a modified random access response (RAR) message containing additional paging information.

According to some embodiments, a method performed by a wireless device for receiving paging information comprises receiving a paging message from a network node. The paging message includes a paging indicator (i.e., a group identifier shorter than a full UE paging identifier) associated with a plurality of wireless devices. The method further comprises determining the wireless device is associated with the paging indicator, transmitting a random access request message to the network node, and receiving a random access response message from the network node. The random access response message is associated with a RNTI. The method further comprises determining, based on the RNTI, whether the random access response message includes additional paging information for the wireless device. Upon determining that the random access response message includes the additional paging information for the wireless device, decoding the random access response message. Otherwise, ignoring the random access response message.

In particular embodiments, the additional paging information includes an identifier that uniquely identifies the wireless device (i.e., a full UE paging identifier) with respect to the plurality of wireless devices.

In particular embodiments, transmitting the random access request message includes transmitting a random access preamble that indicates the random access request message comprises a request for additional paging information.

In particular embodiments, the method further comprising determining, based on the RNTI, that the random access procedure is associated with particular PRACH resources (e.g., more than one RNTI is dedicated for identifying random access response messages that comprise requests for additional paging information, and the multiple RNTIs further differentiate the PRACH resources). The method may further comprise determining, based on the RNTI, that the random access response message is associated with a particular paging occasion (e.g., more than one RNTI is dedicated for identifying random access response messages that comprise requests for additional paging information, and the multiple RNTIs further differentiate the paging occasion in which the paging message was sent to the wireless device).

In particular embodiments, transmitting the random access request message to the network node comprises transmitting a random access preamble that identifies a paging occasion in which the paging message (i.e., the initial downlink message containing the paging indication) was received.

According to some embodiments, a wireless device is operable to receive paging information. The wireless device comprises processing circuitry operable to receive a paging message from a network node. The paging message includes a paging indicator associated with a plurality of wireless devices. The processing circuitry is further operable to determine the wireless device is associated with the paging indicator, transmit a random access request message to the network node, and receive a random access response message from the network node. The random access response message associated with a RNTI. The processing circuitry is operable to determine, based on the RNTI, whether the random access response message includes additional paging information for the wireless device. Upon determining that the random access response includes additional paging information for the wireless device, the processing circuitry is operable to decode the random access response message. Otherwise, the processing circuitry is operable to ignore the random access response message. The additional paging information may include an identifier that uniquely identifies the wireless device with respect to the plurality of wireless devices.

In particular embodiments, the processing circuitry is operable to transmit the random access request message to the network node by transmitting a random access preamble that indicates the random access request message comprises a request for additional paging information.

In particular embodiments, the processing circuitry is further operable to determine, based on the RNTI, that the random access procedure is associated with particular PRACH resources.

In particular embodiments, the processing circuitry is further operable to determine, based on the RNTI, that the random access response message is associated with a particular paging occasion.

In particular embodiments, the processing circuitry is operable to transmit the random access request message to the network node by transmitting a random access preamble that identifies a paging occasion in which the paging message was received.

According to some embodiments, a method in a network node for transmitting paging information comprises transmitting a paging message to a plurality of wireless devices. The paging message includes a paging indicator associated with the plurality of wireless devices. The method further comprises receiving, in response to the paging message, a random access request message from a wireless device of the plurality of wireless devices and transmitting a random access response message to the wireless device. The random access response message includes a RNTI that indicates the random access response includes additional paging information for the wireless device. The additional paging information may include an identifier that uniquely identifies the wireless device with respect to the plurality of wireless devices.

In particular embodiments, receiving the random access request message comprises receiving a random access preamble that indicates the random access request message comprises a request for additional paging information.

In particular embodiments, the RNTI indicates that the random access procedure is associated with particular PRACH resources. The RNTI may indicate that the random access response message is associated with a paging occasion in which the network node transmitted the paging message.

In particular embodiments, receiving the random access request message comprises receiving a random access preamble that identifies a paging occasion in which the network node transmitted the paging message.

According to some embodiments, a network node is operable to transmit paging information. The network node comprises processing circuitry operable to transmit a paging message to a plurality of wireless devices. The paging message includes a paging indicator associated with the plurality of wireless devices. The processing circuitry is further operable to receive, in response to the paging message, a random access request message from a wireless device of the plurality of wireless devices and transmit a random access response message to the wireless device. The random access response message includes a RNTI that indicates the random access response message includes additional paging information for the wireless device. The additional paging information may include an identifier that uniquely identifies the wireless device with respect to the plurality of wireless devices.

In particular embodiments, the processing circuitry is operable to receive the random access request message by receiving a random access preamble that indicates the random access request message comprises a request for additional paging information.

In particular embodiments, the RNTI indicates that the random access procedure is associated with particular PRACH resources. The RNTI may indicate that the random access response message is associated with a paging occasion in which the network node transmitted the paging message.

In particular embodiments, the processing circuitry is operable to receive the random access request message by receiving a random access preamble that identifies a paging occasion in which the network node transmitted the paging message.

According to some embodiments, a wireless device is operable to receive paging information. The wireless device comprises a receiving unit, a determining unit, and a transmitting unit. The receiving unit is operable to receive a paging message from a network node. The paging message includes a paging indicator associated with a plurality of wireless devices. The determining unit is operable to determine the wireless device is associated with the paging indicator. The transmitting unit is operable to transmit a random access request message to the network node. The receiving unit is further operable to receive a random access response message from the network node. The random access response message is associated with a RNTI. The determining unit is further operable to determine, based on the RNTI, whether the random access response message includes additional paging information for the wireless device, and upon determining that the random access response message includes the additional paging information for the wireless device, decode the paging message.

According to some embodiments, a network node is operable to transmit paging information. The network node comprises a transmitting unit and a receiving unit. The transmitting unit is operable to transmit a paging message to a plurality of wireless devices. The paging message includes a paging indicator associated with the plurality of wireless devices. The receiving unit is operable to receive, in response to the paging message, a random access request from a wireless device of the plurality of wireless devices. The transmitting unit is further operable to transmit a random access response message to the wireless device. The random access response message includes a RNTI that indicates the random access response includes additional paging information for the wireless device.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantage(s). Particular embodiments relieve the UEs monitoring for responses after having transmitted random access preambles from the burden of decoding response messages of a type that is not relevant to them. In particular, a UE that transmits a regular random access preamble for the purpose of regular random access (i.e., without having received a paging indication with a matching PI) does not have to decode a response message that is targeting UEs that have transmitted preambles after having received a paging indication with matching PIs (i.e., targeting UEs potentially being paged with the response-driven paging concept).

Particular embodiments also avoid situations where the network otherwise could have been forced to transmit hybrid random access response (RAR) messages containing a mix of regular RAR content (e.g., in the form of MAC RARs) and additional paging information, which would increase the complexity (and thus the effort) of both specifications and implementations.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
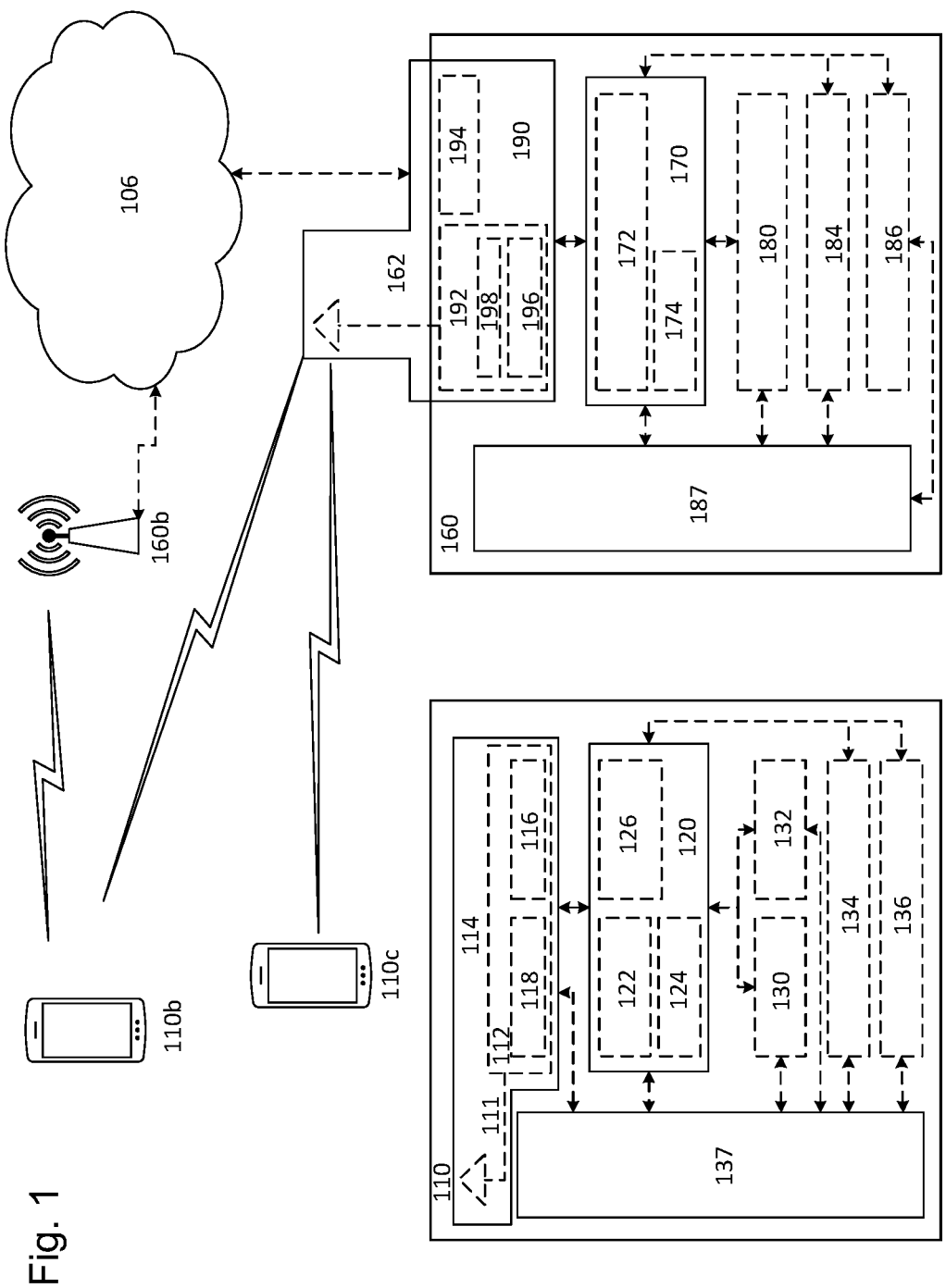
FIG. 1 is a block diagram illustrating an example wireless network.

As described above, certain challenges currently exist with response-driven paging in fifth generation (5G) new radio (NR). For example, response-driven paging reduces the amount of data initially transmitted by the network in the paging beam sweep, but it does so at the expense of increased signalling in the uplink and at the expense of lost user equipment (UE) uniqueness in the initial paging indication. As a result, a large fraction of the UEs contacting the network (after finding a matching paging indicator (PI) in the paging indication) to determine if they were indeed target by the paging indication will do so in vain.

In addition, the combined preamble transmissions from UEs responding to paging indications containing PIs and UEs initiating regular random access (i.e., not responding to a paging indication with a matching PI) generate an increased number of response messages from the network, which all the preamble transmitting UEs have to monitor. The resulting increased response message decoding effort represents an undesirable burden for the UEs.

Certain aspects of the present disclosure and their embodiments may provide solutions to these or other challenges. Particular embodiments use one or more dedicated radio network temporary identifiers (RNTIs) scrambled into the cyclic redundancy check (CRC) in the downlink control information (DCI) on the PDCCH when the network transmits response messages to preambles which are dedicated for request of additional paging information in conjunction with response-driven paging. The dedicated RNTI indicates to a UE receiving the scheduling allocation for the response message whether the response message is of the type the UE is interested in. Thus, the UE can refrain from decoding the actual response message if the RNTI indicates a non-interesting response type.

For example, a UE having transmitted a regular random access preamble for the purpose of regular random access can refrain from decoding the response message if the associated RNTI indicates that the response message is a modified random access response (RAR) message containing additional paging information.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As described in the introduction, an NR network may transmit paging using beamforming transmission on high carrier frequencies and beam sweeping to cover an entire cell with the page. This creates a large amount of control signalling overhead, particularly because the paging signals are typically transmitted in multiple cells.

To reduce the control signalling overhead associated with paging on higher carrier frequencies, a group paging concept has been proposed where the paging identifier is associated with multiple UEs or a group of UEs (referred to as a paging indicator (PI)). The PI may be based on a truncated UE ID (e.g., S-TMSI or IMSI), or a group ID if the UE has been associated with such a group at an earlier stage. The PI may also be based on a hash applied to the UE ID (e.g., S-TMSI or IMSI), or a bit position in a bitmap.

When a UE receives an initial downlink message containing the paging indication and a matching PI, the UE does not know for sure if it is actually being paged or not. To resolve this ambiguity, the UE contacts the network to retrieve additional paging information (i.e., request the full UE paging identifier(s)). Because the PI is not UE unique, and thus ambiguous, multiple UEs, many of which that are not the target of the paging, may respond to a paging indication. The number of responding UEs in the cell depends on several factors, such as the size of the PI in relation to a full UE paging identifier and the number of UEs listening to the paging occasion in which the paging indication and the matching PI is sent.

The UE response is either performed by a regular random access procedure, or by a modified random access procedure whereby the UE transmits a special random access preamble to indicate a detected PI match. The response from the UE triggers the network to send the additional paging information (full UE paging identifier(s)) to the UE. As a side-effect of the UE response, the network is also informed of the direction in which the responding UE can be reached. The UE implicitly reports its preferred downlink beam direction by selecting a PRACH resource which is associated with the selected downlink beam.

In some embodiments, the network (e.g., the gNB) transmits the additional paging information directly in response to the dedicated preamble which indicates a request for additional paging information (i.e., in a modified RAR message). In some embodiments, the UE may establish a radio resource control (RRC) connection to request and receive the additional paging information or, with some optimization, indicates its request for additional paging information in the third message of the random access procedure and receives the additional paging information in the fourth message of the random access procedure. Some embodiments enable the network to identify the intention of the random request based on the received preamble (i.e., that the intention of the preamble is to trigger the network (e.g., gNB) to transmit additional paging information, which then results in a modified RAR message). Other embodiments may trigger the network (e.g., gNB) to transmit a regular RAR message.

Particular embodiments are more streamlined than others and the property to enable early identification of requests for additional paging information (determined when the dedicated preamble is received) and to trigger a different response message (e.g., a modified RAR containing additional paging information) than a regular RAR (i.e., a RAR sent in response to a regular random access request) can be used whereby UEs monitoring for response messages can distinguish between regular and modified RARs without having to decode the actual response message.

When a downlink message is transmitted on the PDSCH, including responses to random access preambles (i.e., RAR messages), the scheduling allocation (allocating downlink transmission resources) for the message is addressed to an RNTI on the PDCCH. The RNTI is not explicitly indicated on the PDCCH, but is implicitly encoded into the CRC (e.g., by scrambling in the CRC with the RNTI) of the DCI containing the scheduling allocation. In the case of RAR messages, the RNTI is taken from a standardized set of RNTIs, denoted RA-RNTIs, wherein the RA-RNTI to select is derived from the PRACH resource (in the time and frequency domains) on which the preamble(s) the RAR responds to was (were) transmitted. Thus, there is a mapping between the PRACH resource and the RA-RNTI.

In particular embodiments, the modified RAR messages used for transmission of additional paging information in the response-driven paging solutions are distinguished from the regular RAR messages by means of the RNTI used when transmitting the scheduling allocation for the message on the PDCCH. Thus, when the response message is a modified RAR message carrying additional paging information, a RNTI other than one of the existing standardized RA-RNTIs is used.

In particular embodiments, a single RNTI may be dedicated for this purpose (i.e., for transmission of modified RAR messages in response to preambles requesting additional paging information in conjunction with response-driven paging). Using different RNTIs for separation of response messages based on the PRACH resource used for the transmission of the requesting preamble is not needed, because what matters in this case is the paging occasion (PO) in which the paging indication with the PI was transmitted and all UEs that found a matching PI in that paging indication will transmit a preamble requesting additional paging information and all those (one or more) UE(s) will be interested in receiving the triggered modified RAR message, irrespective of which PRACH resource they transmitted the request preamble on.

In some embodiments, if separate response messages based on the PRACH resource is beneficial, then the single dedicated RNTI may be extended to a set of dedicated RNTIs that map to the PRACH resources in a similar manner as the RA-RNTIs.

The choice of reserving a single dedicated RNTI for requesting additional paging information in conjunction with response-driven paging is based on the assumption that it is unambiguous which paging occasion the modified RAR message is associated with. This in turn is based on the assumption that the response window (i.e., the time window within which the gNB must transmit the response to a received random access preamble, e.g., a preamble requesting additional paging information) is shorter than the time interval between two paging occasions.

If paging occasions are configured to be so dense that it is no longer unambiguous which paging occasion a modified RAR message carrying additional paging information pertains to (e.g., if the paging occasion density is comparable to the PRACH density (in the time domain)), then it may be preferable to reserve multiple dedicated RNTIs to be able to associate the RNTI used for scheduling allocation for a modified RAR message with the paging occasion that the additional paging information in the modified RAR message pertains to. The algorithm for association between a dedicated RNTI and a paging occasion may be standardized and/or configured in the system information of each cell and/or partly standardized with some configuration possibility left to be provided in the system information.

An example algorithm may include the following. An RNTIdedicated_for_esponse_driven_paging=BaseOffset+Po_Index, where $0 \leq Po\_Index \leq Po\_Index\_Max$, and where Po_Index_Max=T//Po_Int_Min, ("//" indicate integer division). Po_Index is a numbering of the paging occasions to which timing allows the additional paging information in the modified RAR message to pertain to. T is the configured (or standardized) maximum time period that may elapse between a paging occasion and the modified RAR message containing additional paging information pertaining to the paging occasion. Po_Int_Min is the minimum time interval between two paging occasions.

Particular embodiments may include configuring a set of different preambles for requesting additional paging information (i.e., the preamble selection is based on in which paging occasion the transmission of the preamble is triggered). The dedicated RNTI for the modified RAR message containing additional paging information may be selected based on the preamble. This way, the RNTI, and thus the modified RAR message associated with the RNTI, may be associated with the paging occasion via the preamble associated with the paging occasion.

FIG. 1 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 2:
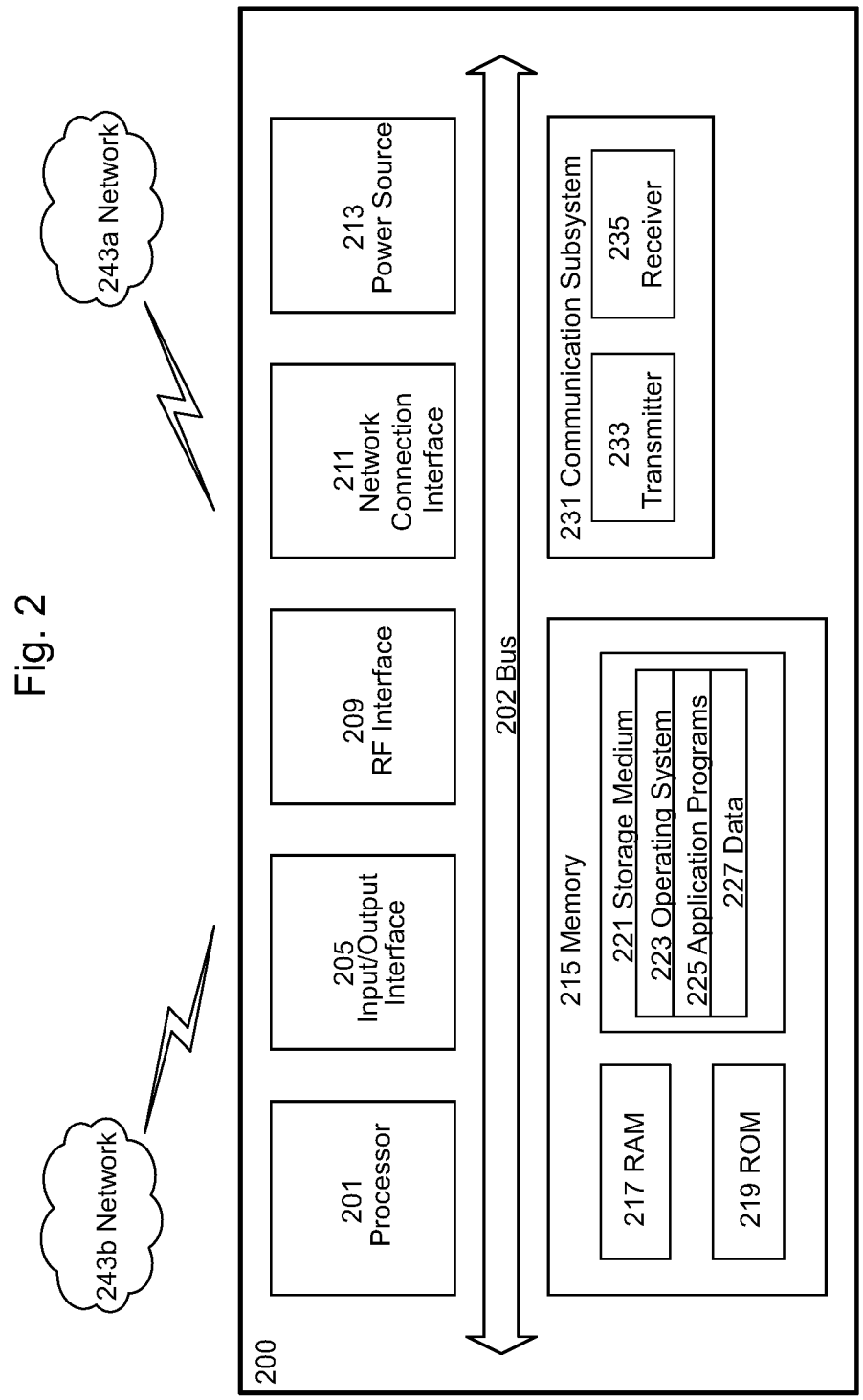
FIG. 2 illustrates an example user equipment, according to certain embodiments.

FIG. 2 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
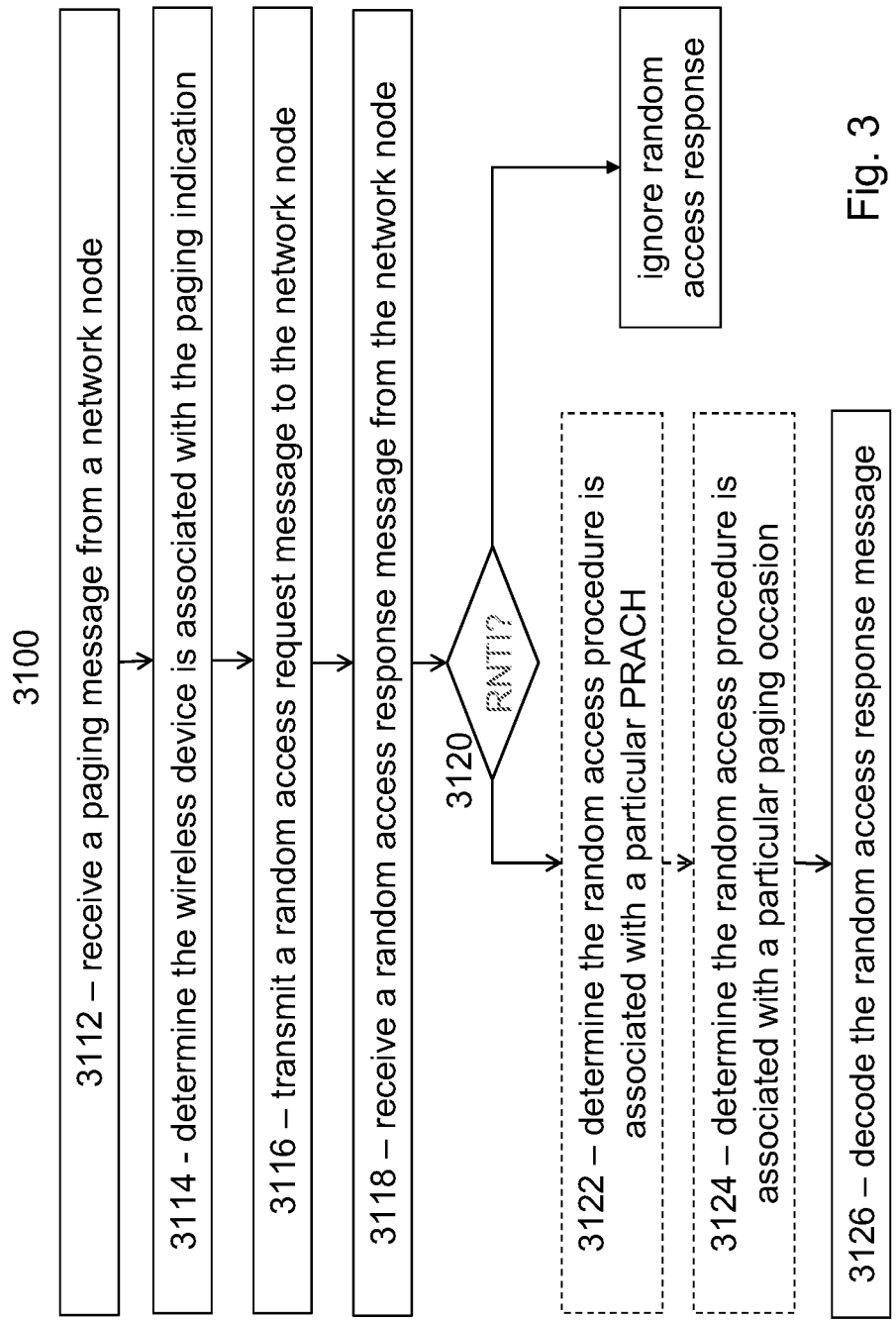
FIG. 3 illustrates a flowchart of an example method in a wireless device for receiving paging information, according to certain embodiments.

FIG. 3 illustrates a flowchart of an example method in a user equipment for receiving paging information, according to certain embodiments. In particular embodiments, one or more steps of FIG. 3 may be performed by wireless device 110 described with respect to FIG. 1.

The method begins at step 3112, where the wireless device (e.g., wireless device 110) receives receive a paging message from a network node (e.g., network node 160). The paging message includes a paging indication associated with a plurality of wireless devices. The paging indication may be a group identifier that is shorter than a full UE paging identifier. Using the short paging identifier facilitates smaller sized paging messages.

At step 3114, the wireless device determines the wireless device is associated with the paging indication. For example, wireless device 110 determines it is in the group of wireless devices represented by the paging indication.

The wireless device, however, does not know if it is the intended target of the page. The wireless device continues to step 3116, where the wireless device transmits a random access request message to the network node.

In some embodiments, the wireless device transmits a random access preamble that indicates the random access request message comprises a request for additional paging information. In some embodiments, the wireless device transmits a random access preamble that identifies the paging occasion in which the paging message at step 3112 was received.

At step 3120, the wireless device determines, based on the RNTI, whether the random access response includes additional paging information for the wireless device. For example, the RNTI may comprise a conventional RA-RNTI, or the RNTI may comprise one of one or more RNTIs reserved for random access responses that include additional information for group paging. By analyzing the RNTI, the wireless device may more efficiently process random access responses. For example, upon determining that the random access response includes additional paging information for the wireless device, the wireless device continues to steps 3122-3126. Otherwise, the wireless device can ignore the random access response message and conserve processing resources by not decoding the random access response.

At step 3122, the wireless device may determine, based on the RNTI, that the random access procedure is associated with particular PRACH resources. For example, the network may reserve more than one RNTI for identifying random access response messages that comprise requests for additional paging information, and the multiple RNTIs further differentiate the PRACH resources.

At step 3124, the wireless device may determine, based on the RNTI, that the random access response message is associated with a particular paging occasion. For example, the network may reserve more than one RNTI for identifying random access response messages that comprise requests for additional paging information, and the multiple RNTIs further differentiate the paging occasion in which the paging message was sent to the wireless device.

At step 2126, the wireless device decodes the random access response message. The random access response message may include an identifier that uniquely identifies the wireless device (i.e., a full UE paging identifier) with respect to the plurality of wireless devices. If the full UE paging identifier matches an identifier of the wireless device, then the paging is intended for the wireless device. Otherwise, the paging is intended for another wireless device in the group.

Modifications, additions, or omissions may be made to method 3100 of FIG. 3. Additionally, one or more steps in the method of FIG. 3 may be performed in parallel or in any suitable order.

Figure 4:
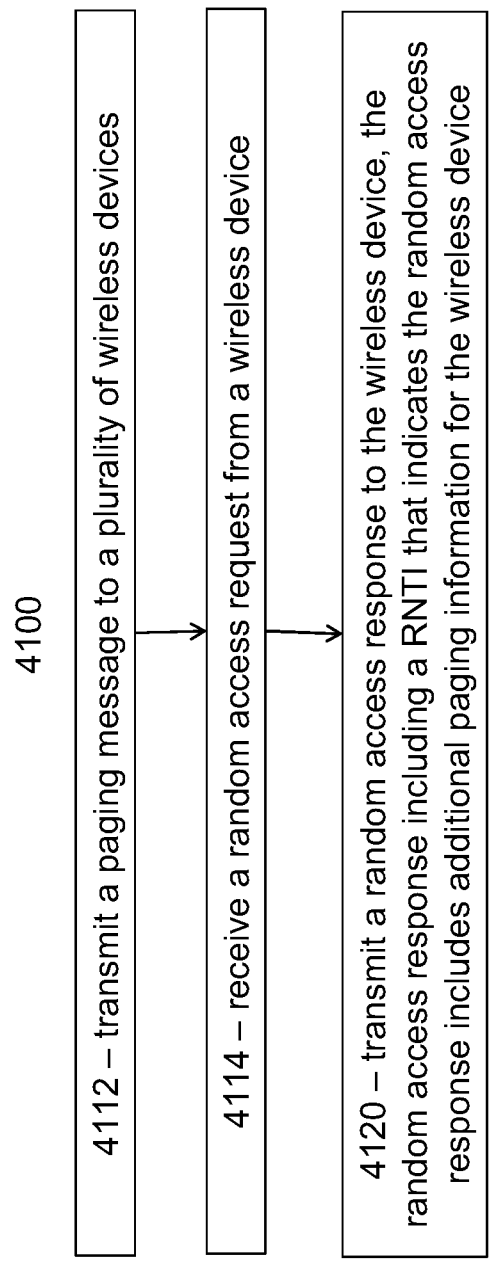
FIG. 4 illustrates a flowchart of an example method in a network node for transmitting paging information, according to certain embodiments.

FIG. 4 illustrates a flowchart of an example method in a network node for transmitting paging information, according to certain embodiments. In particular embodiments, one or more steps of FIG. 4 may be performed by network node 160 described with respect to FIG. 1.

The method begins at step 4112, where the network node (e.g., network node 160) transmits a paging message to a plurality of wireless devices (e.g., wireless devices 110). The paging message includes a paging indication associated with the plurality of wireless devices. The paging message is similar to the paging message described with respect to step 3112 of FIG. 3.

At step 4114, the network node receives, in response to the paging message, a random access request from a wireless device of the plurality of wireless devices. For example, one or more wireless devices received the paging message and determined that it is a member of the group. The wireless responded with the random access request to obtain additional information about the target of the page.

In particular embodiments, the random access request message includes a random access preamble that indicates the random access request message is a request for additional paging information. In particular embodiments, the random access request message includes a random access preamble that identifies a paging occasion in which the network node transmitted the paging message.

At step 4116, the network node transmits a random access response to the wireless device. The random access response includes a RNTI that indicates the random access response includes additional paging information for the wireless device. The additional paging information may include an identifier that uniquely identifies the wireless device with respect to the plurality of wireless devices.

In particular embodiments, the RNTI indicates that the random access procedure is associated with particular PRACH resources. The RNTI may indicate that the random access response message is associated with a paging occasion in which the network node transmitted the paging message.

Modifications, additions, or omissions may be made to method 4100 of FIG. 4. Additionally, one or more steps in the method of FIG. 4 may be performed in parallel or in any suitable order.

Figure 5:
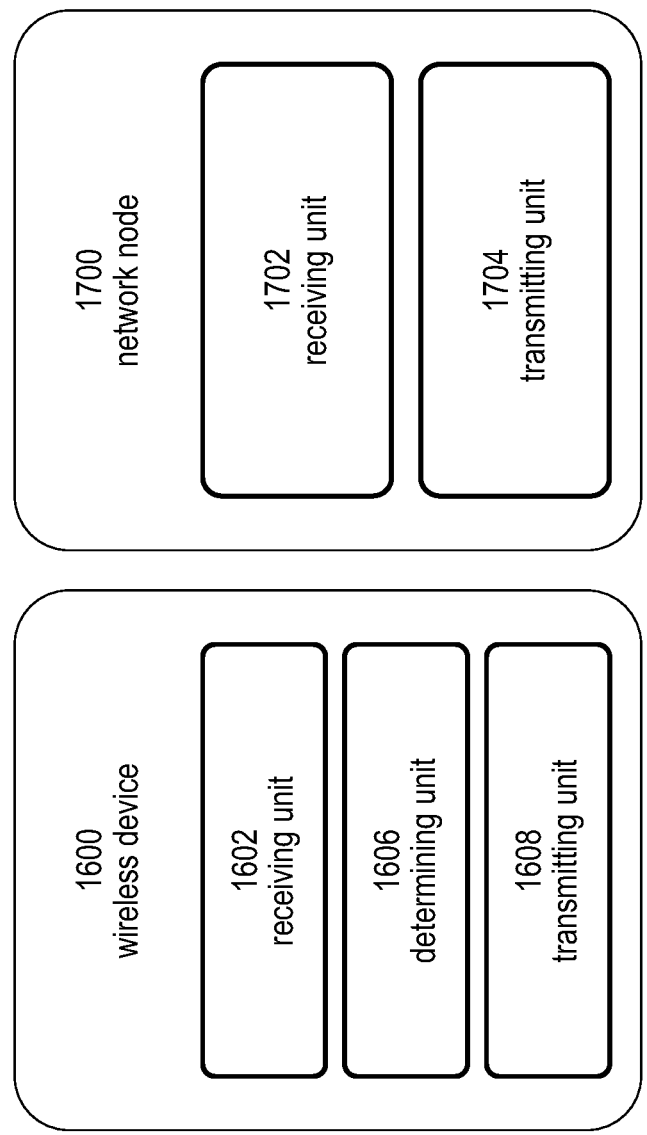
FIG. 5 illustrates a schematic block diagram of two apparatuses in a wireless network, according to certain embodiments.

FIG. 5 illustrates a schematic block diagram of two apparatuses in a wireless network (for example, the wireless network illustrated in FIG. 1). The apparatuses include a wireless device and a network node (e.g., wireless device 110 or network node 160 illustrated in FIG. 1). Apparatuses 1600 and 1700 are operable to carry out the example methods described with reference to FIGS. 3 and 4, respectively, and possibly any other processes or methods disclosed herein. It is also to be understood that the method of FIGS. 3 and 4 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving unit 1602, determining unit 1606, maintaining unit 1608, and any other suitable units of apparatus 1600 to perform corresponding functions according one or more embodiments of the present disclosure. Similarly, the processing circuitry described above may be used to cause receiving unit 1702, transmitting unit 1704, and any other suitable units of apparatus 1700 to perform corresponding functions according one or more embodiments of the present disclosure.

As illustrated in FIG. 5, apparatus 1600 includes receiving unit 1602 configured to receive a paging message from a network node. Apparatus 1600 also includes determining unit 1606 configured to determine if a wireless device is associated with a particular paging indication, whether an RNTI is associated with one or more of a type of random access response message, a set of PRACH resources, and/or a paging occasion. Apparatus 1600 also includes transmitting unit 1608 configured to transmit a random access request to a network node.

As illustrated in FIG. 5, apparatus 1700 includes receiving unit 1702 configured to receive a random access request from a wireless device. Apparatus 1700 also includes transmitting unit 17o4 configured to transmit paging messages and random access response messages to a wireless device.

Figure 6:
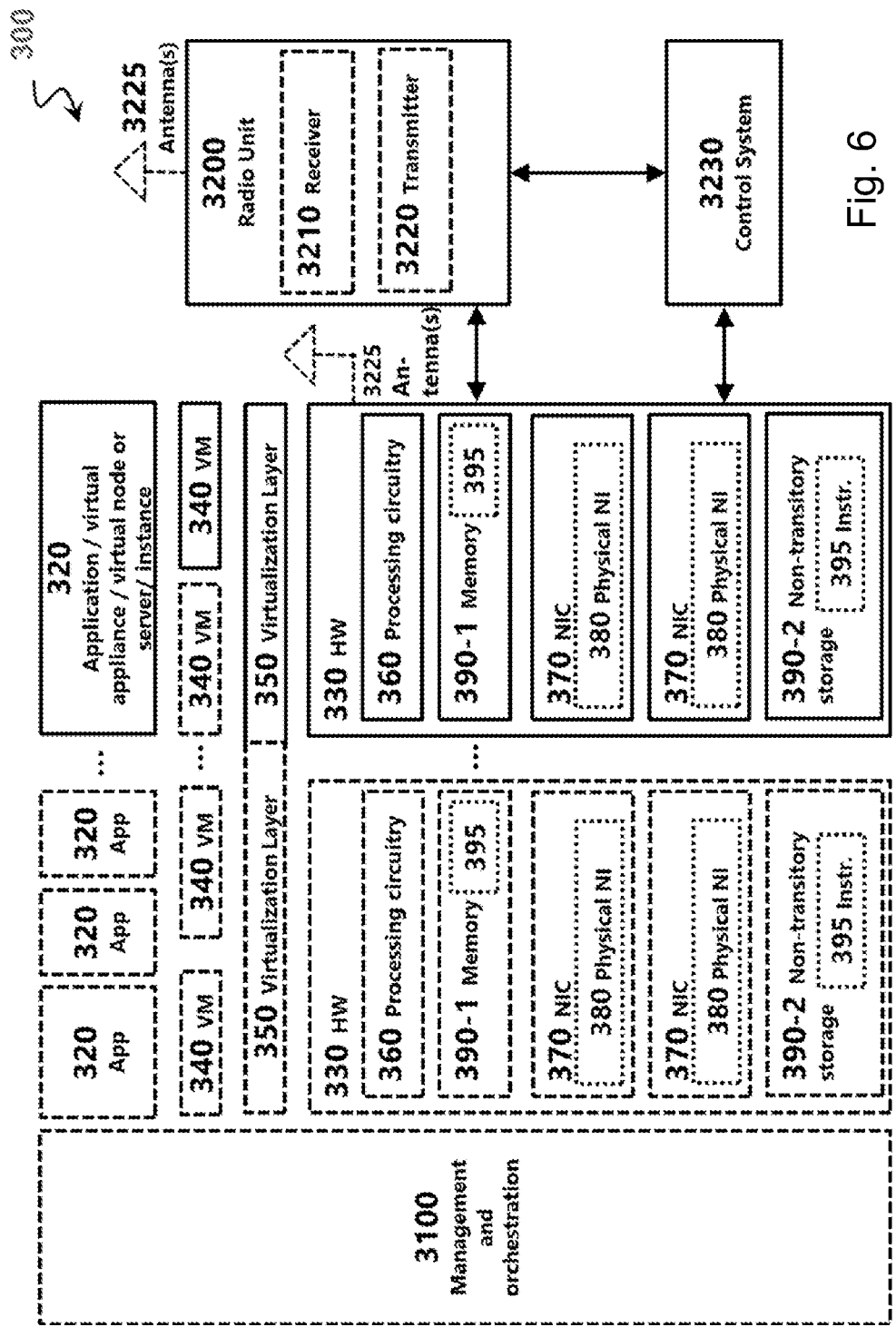
FIG. 6 illustrates an example virtualization environment, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 7:
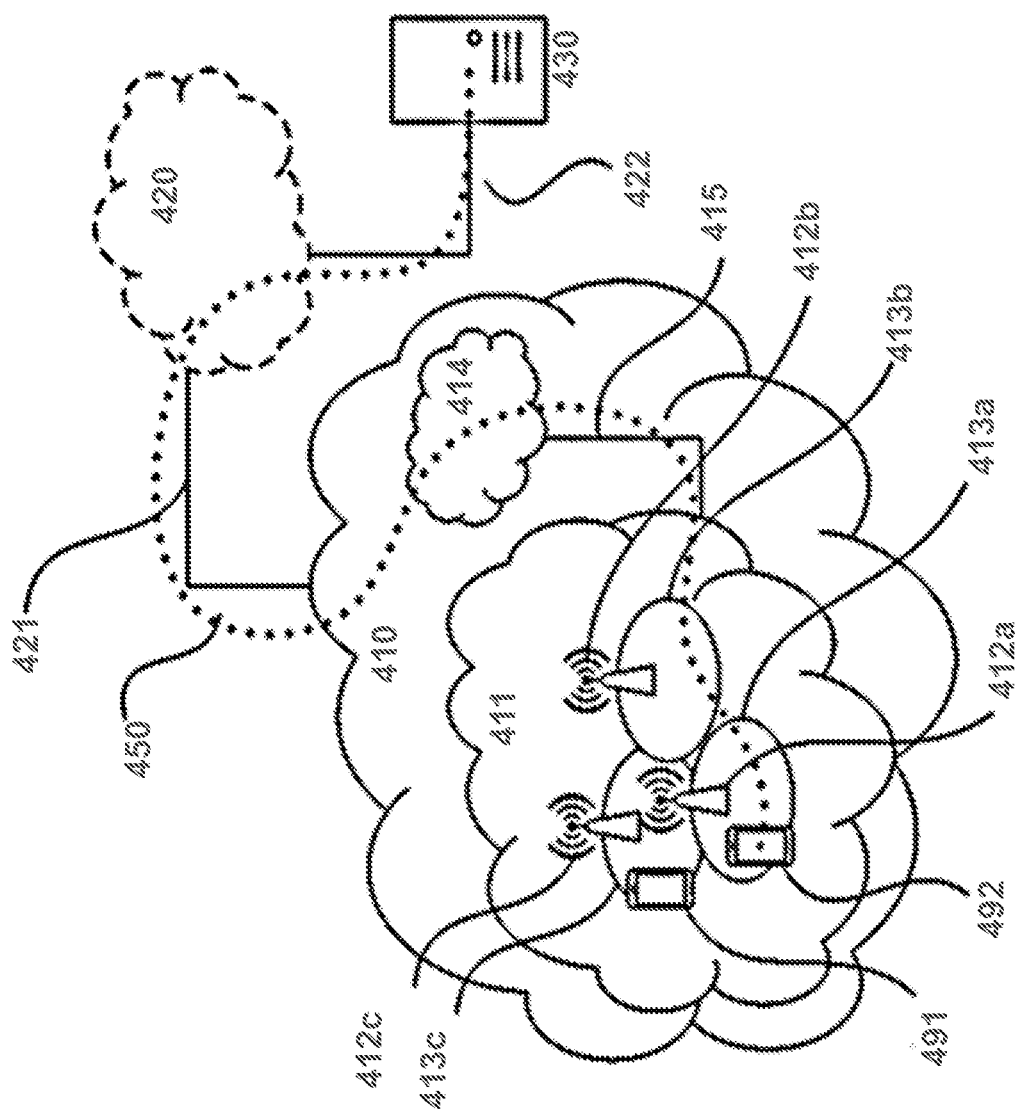
FIG. 7 illustrates an example telecommunication network connected via an intermediate network to a host computer, according to certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
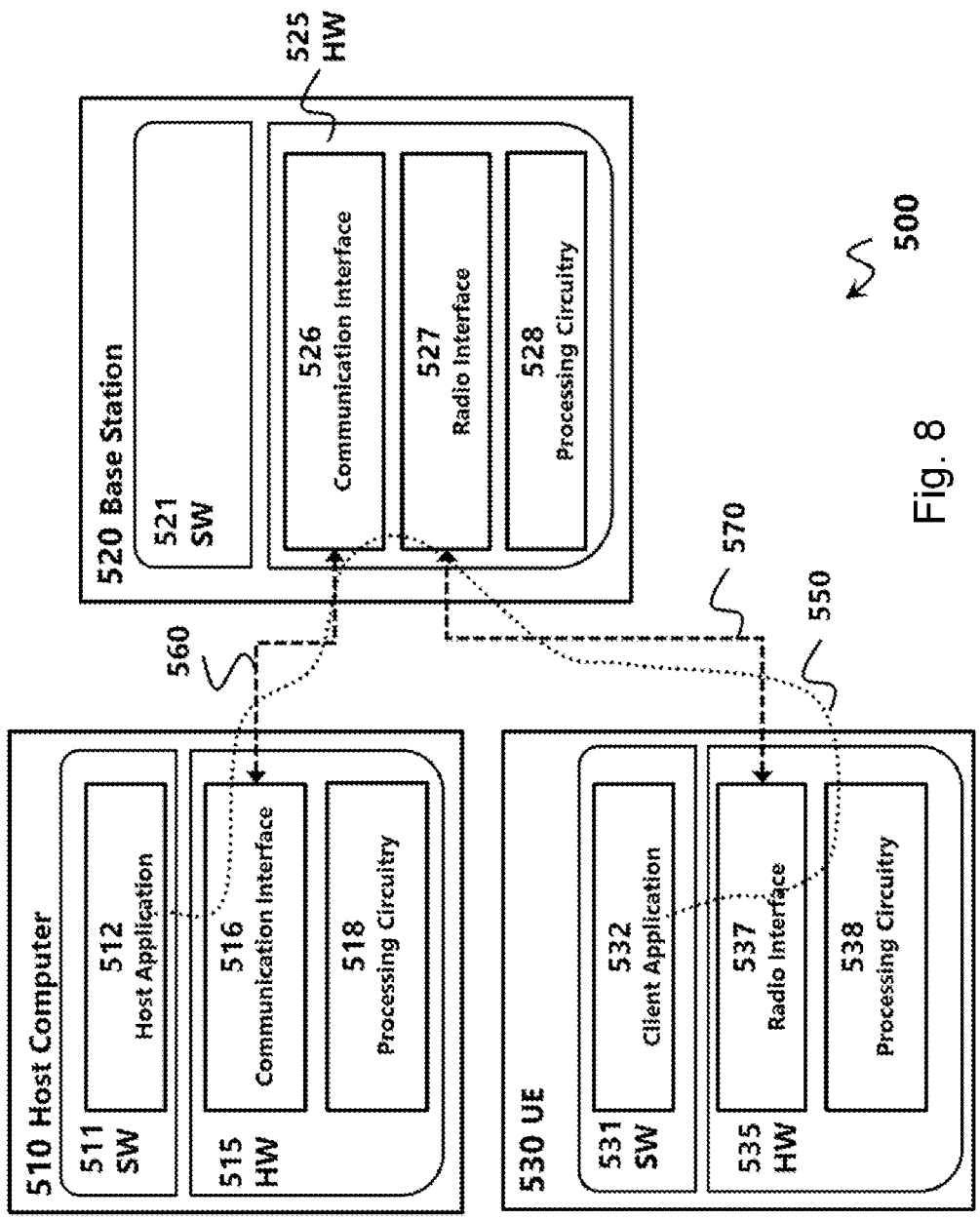
FIG. 8 illustrates an example host computer communicating via a base station with a user equipment over a partially wireless connection, according to certain embodiments.

FIG. 8 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct, or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 5 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
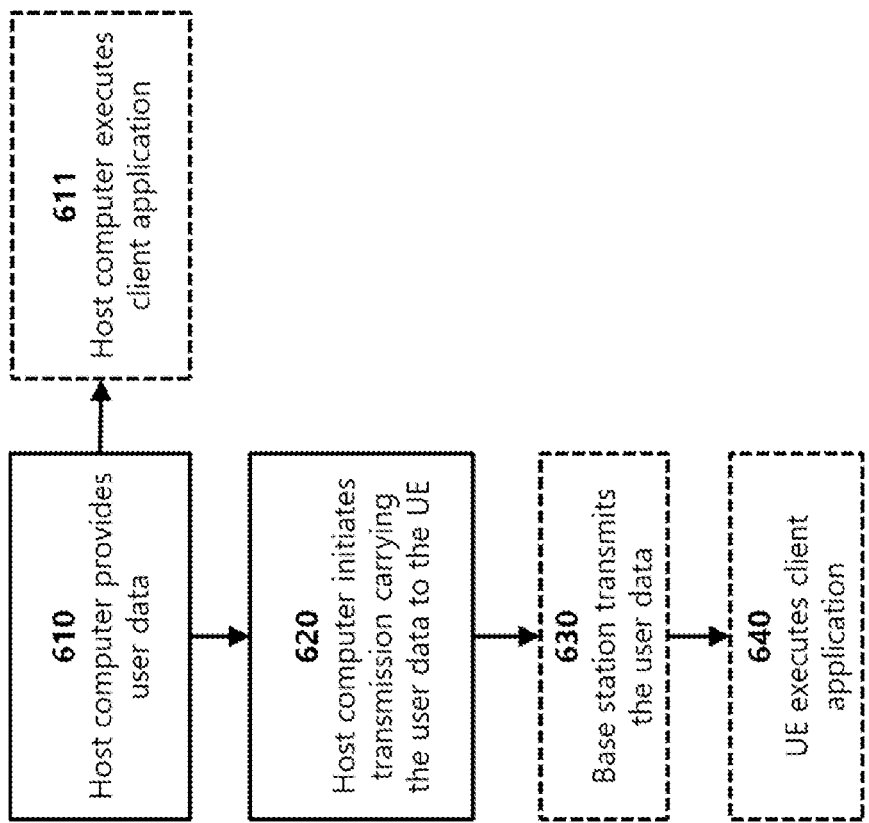
FIG. 9 is a flowchart illustrating a method implemented, according to certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
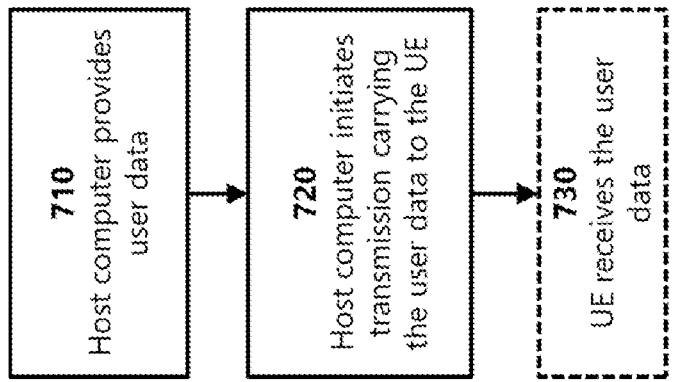
FIG. 10 is a flowchart illustrating a method implemented in a communication system, according to certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 11:
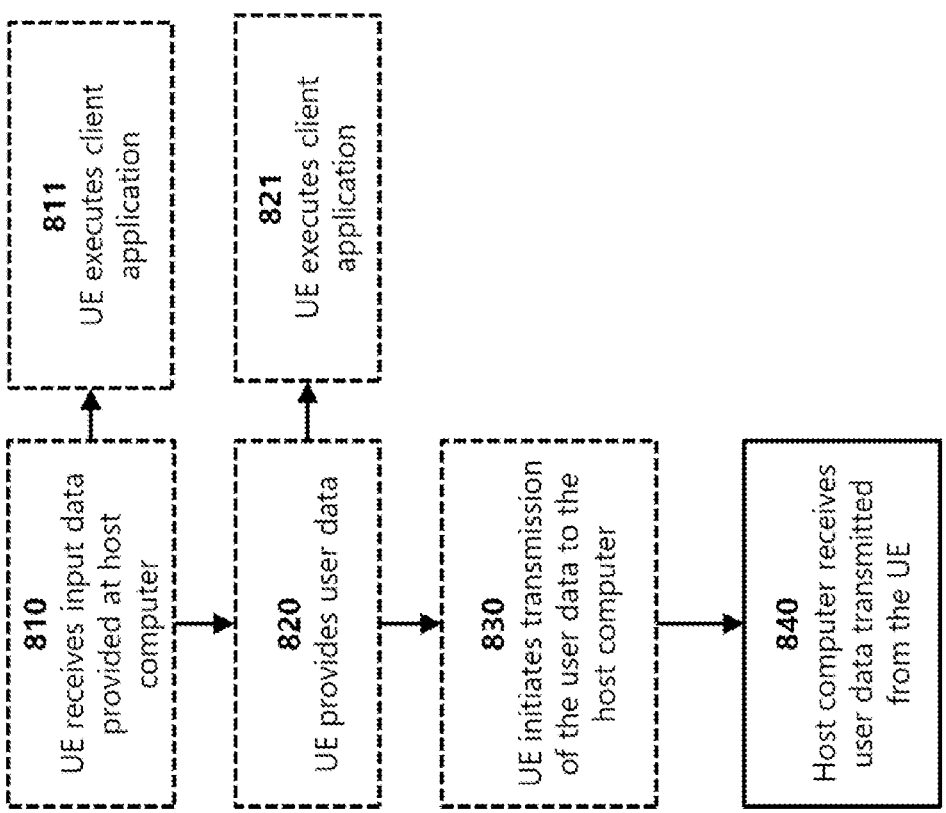
FIG. 11 is a flowchart illustrating a method implemented in a communication system, according to certain embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 12:
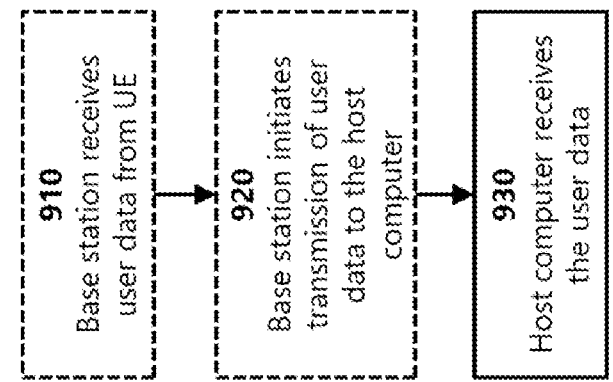
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
CRC Cyclic Redundancy Check
C-RNTI Cell RNTI
CSI Channel State Information
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
ETWS Earthquake and Tsunami Warning System
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HF High Frequency/High Frequencies
HO Handover
HSPA High Speed Packet Access
HRPD High Rate Packet Data
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PI Paging Indicator
PO Paging Occasion
PRACH Physical Random Access Channel
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RA-RNTI Random Access RNTI
RNA RAN Notification Area
RNTI Radio Network Temporary Identifier
RAT Radio Access Technology
RLM Radio Link Management
RNC Radio Network Controller
RNTI Radio Network Temporary Identifier
RRC Radio Resource Control RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number or Single Frequency Network
SGW Serving Gateway
SI System Information
SIB System Information Block
SNR Signal to Noise Ratio
SON Self Optimized Network
SS Synchronization Signal
SSS Secondary Synchronization Signal
S-TMSI SAE-TMSI
TDD Time Division Duplex
TDOA Time Difference of Arrival
TMSI Temporary Mobile Subscriber Identity
TRP Transmission/Reception Point
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for receiving paging information, the method comprising:
   receiving a group paging message from a network node, the group paging message including a paging indicator associated with a plurality of wireless devices;
   determining the wireless device is associated with the paging indicator;
   in response to determining the wireless device is associated with the paging indicator, transmitting a random access request message to the network node, wherein transmitting the random access request message to the network node comprises transmitting a random access preamble that identifies a paging occasion in which the paging message was received;
   receiving a random access response message from the network node, the random access response message associated with a radio network temporary identifier (RNTI);
   determining, based on the RNTI, whether the random access response message is a modified group paging random access response message that includes additional paging information; and
   upon determining that the random access response message includes the additional paging information, decoding the random access response message.

2. The method of claim 1, further comprising, upon determining that the random access response message does not include the additional paging information, ignoring the random access response message.

3. The method of claim 1, wherein the additional paging information includes an identifier that uniquely identifies the wireless device with respect to the plurality of wireless devices.

4. The method of claim 1, wherein transmitting the random access request message to the network node comprises transmitting a random access preamble that indicates the random access request message comprises a request for the additional paging information.

5. The method of claim 1, further comprising determining, based on the RNTI, that the random access response message is associated with particular physical random access channel (PRACH) resources.

6. The method of claim 1, further comprising determining, based on the RNTI, that the random access response message is associated with a particular paging occasion.

7. A wireless device operable to receive paging information, the wireless device comprising processing circuitry operable to:
   receive a group paging message from a network node, the group paging message including a paging indicator associated with a plurality of wireless devices;
   determine the wireless device is associated with the paging indicator;
   in response to determining the wireless device is associated with the paging indicator, transmit a random access request message to the network node, wherein the processing circuitry is operable to transmit the random access request message to the network node by transmitting a random access preamble that identifies a paging occasion in which the paging message was received;
   receive a random access response message from the network node, the random access response message associated with a radio network temporary identifier (RNTI);
   determine, based on the RNTI, whether the random access response message is a modified group paging random access response message that includes additional paging information; and
   upon determining that the random access response message includes the additional paging information, decode the random access response message.

8. The wireless device of claim 7, the processing circuitry further operable to, upon determining that the random access response message does not include the additional paging information, ignore the random access response message.

9. The wireless device of claim 7, wherein the additional paging information includes an identifier that uniquely identifies the wireless device with respect to the plurality of wireless devices.

10. The wireless device of claim 7, wherein the processing circuitry is operable to transmit the random access request message to the network node by transmitting a random access preamble that indicates the random access request message comprises a request for the additional paging information.

11. The wireless device of claim 7, the processing circuitry further operable to determine, based on the RNTI, that the random access response message is associated with particular physical random access channel (PRACH) resources.

12. The wireless device of claim 7, the processing circuitry further operable to determine, based on the RNTI, that the random access response message is associated with a particular paging occasion.

13. A network node operable to transmit paging information, the network node comprising processing circuitry operable to:
- transmit a group paging message to a plurality of wireless devices, the group paging message including a paging indicator associated with the plurality of wireless devices;
- receive, in response to the group paging message, a random access request message from a wireless device of the plurality of wireless devices, wherein the processing circuitry is operable to receive the random access request message by receiving a random access preamble that identifies a paging occasion in which the network node transmitted the paging message; and
- transmit a random access response message to the wireless device, the random access response message is a modified group paging random access response message that includes a radio network temporary identifier (RNTI) that indicates the random access response includes additional paging information for the wireless device.

14. The network node of claim 13, wherein the additional paging information includes an identifier that uniquely identifies the wireless device with respect to the plurality of wireless devices.

15. The network node of claim 13, wherein the processing circuitry is operable to receive the random access request message by receiving a random access preamble that indicates the random access request message comprises a request for additional paging information.

16. The network node of claim 13, wherein the RNTI indicates that the random access response message is associated with particular physical random access channel (PRACH) resources.

17. The network node of claim 13, wherein the RNTI indicates that the random access response message is associated with a paging occasion in which the network node transmitted the paging message.

* * * * *